(12) United States Patent
Fritzsch et al.

(10) Patent No.: US 9,932,055 B2
(45) Date of Patent: Apr. 3, 2018

(54) RAIL VEHICLE COMPRISING A TACHOMETER-SPEED DISPLAY DEVICE, AND A METHOD FOR OPERATING SUCH A RAIL VEHICLE

(71) Applicant: SIEMENS AKTIENGESELLSCHAFT, Munich (DE)

(72) Inventors: Guido Fritzsch, Berlin (DE); Rupert Litterst, Meine (DE)

(73) Assignee: Siemens Aktiengesellschaft, Munich (DE)

( * ) Notice: Subject to any disclaimer, the term of this patent is extended or adjusted under 35 U.S.C. 154(b) by 212 days.

(21) Appl. No.: 14/770,610

(22) PCT Filed: Feb. 14, 2014

(86) PCT No.: PCT/EP2014/052906
§ 371 (c)(1),
(2) Date: Aug. 26, 2015

(87) PCT Pub. No.: WO2014/131630
PCT Pub. Date: Sep. 4, 2014

(65) Prior Publication Data
US 2016/0001800 A1 Jan. 7, 2016

(30) Foreign Application Priority Data
Feb. 26, 2013 (DE) .................. 10 2013 203 124

(51) Int. Cl.
*B61L 15/00* (2006.01)
*G01P 1/07* (2006.01)
(Continued)

(52) U.S. Cl.
CPC .......... *B61L 15/009* (2013.01); *B61L 25/021* (2013.01); *G01P 1/07* (2013.01); *G02F 1/15* (2013.01); *B61L 2027/0044* (2013.01)

(58) Field of Classification Search
CPC .. B61L 15/00; B61L 15/0018; B61L 15/0063; B61L 15/009; B60K 35/00
See application file for complete search history.

(56) References Cited

U.S. PATENT DOCUMENTS 7,089,093 B2 * 8/2006 Lacote .................... B61L 23/34
246/2 R
7,365,707 B2 * 4/2008 Schobben ............... B60K 35/00
345/9

FOREIGN PATENT DOCUMENTS

CN          1576132 A      2/2005
DE   102008045051 A1      3/2010
(Continued)

OTHER PUBLICATIONS

Schaffarczik K.; "Das neue flexible Führerraumanzeigesystem in Triebfahrzeugen der DB AG"; Signal + Draht, Tezlaff Verlag GmbH, Darmstadt; vol. 93; pp. 12-16; 2011 (=see summary at the end of the document).

(Continued)

*Primary Examiner* — Robert McCarry, Jr.
(74) *Attorney, Agent, or Firm* — Laurence Greenberg; Werner Stemer; Ralph Locher

(57) ABSTRACT

A rail vehicle has a tachometer-speed display device and an European train control system speed display device. In order to easily avoid the speed being read incorrectly by the vehicle driver in such a rail vehicle, the glass cover of the tachometer-speed display device is an electro chrome glass (Continued)

pane that contains an electrical connection device. A method also operates a rail vehicle which contains such a tachometer-speed display device.

6 Claims, 1 Drawing Sheet

(51) Int. Cl.
*B61L 25/02* (2006.01)
*G02F 1/15* (2006.01)
*B61L 27/00* (2006.01)

(56) References Cited

FOREIGN PATENT DOCUMENTS

| EP | 1118973 | A2 | 7/2001 |
| EP | 1681222 | A1 | 7/2006 |
| FR | 2731957 | A1 | 9/1996 |

OTHER PUBLICATIONS

Intelligentes Glas/ Elektrochromes Glas Wikipedia; http://de.wikipedia.org/wiki/Intelligentes_Glas 14.02.2013 (c.f. statement of relevance in description of the application) (2 Seiten).

* cited by examiner

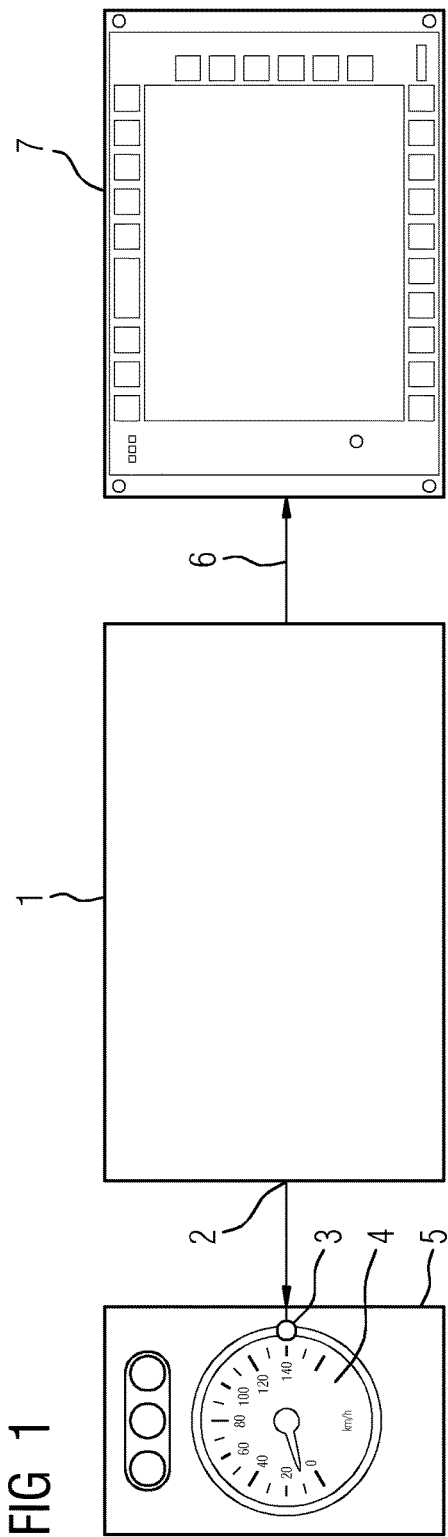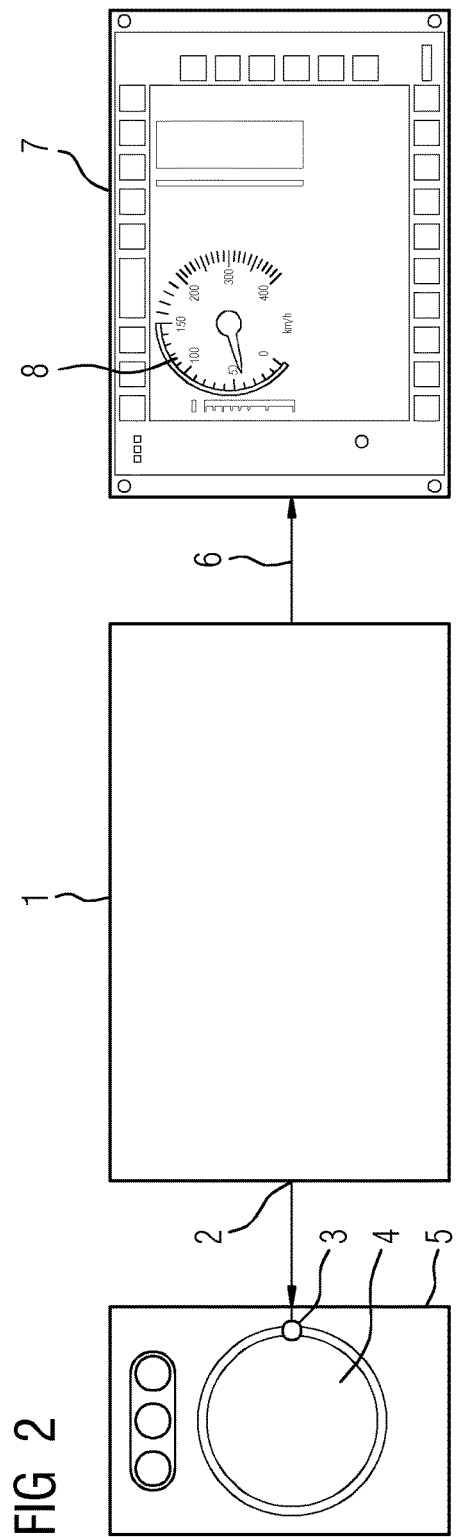

RAIL VEHICLE COMPRISING A TACHOMETER-SPEED DISPLAY DEVICE, AND A METHOD FOR OPERATING SUCH A RAIL VEHICLE

BACKGROUND OF THE INVENTION

Field of the Invention

It has long been recognized that rail vehicles are equipped with a tachometer-speed display device in order to provide the vehicle driver with information relating to the respective speed of the rail vehicle. It is also known that a so-called European Train Control System (ETCS) comprising an ETCS vehicle device was developed a few years ago and has in the meantime been introduced. This device contains inter alia an ETCS computer and a driver machine interface (DMI). The respective speed of the rail vehicle is inter alia displayed on this driver machine interface (DMI) so that the driver machine interface also forms an ETCS speed display device. In such cases the speed is determined for instance using wheel revolution counters and Doppler radars.

With the introduction of the ETCS into railroad companies from various European countries, the tachometer-speed display device is retained in existing vehicles and an ETCS speed display device is also provided. Rail vehicles equipped in such a way can then be used both on railroad tracks provided with conventional traffic management systems and also on such railroad tracks which are already equipped for ETCS operation.

If a rail vehicle is used both with a tachometer-speed display device and also with an ETCS speed display device, then on account of varying accuracy different measured values are displayed when the speed is determined. Moreover, the deviations between the speed displays also result from the safety margins which also have to be taken into account in the ETCS. There is the risk that against his instructions a vehicle driver inadvertently uses the tachometer-speed display device to control the rail vehicle despite the rail vehicle being in ETCS operation. In such a case, unwanted system interventions may result on account of the ETCS. There is therefore an instruction to the vehicle driver to ignore the tachometer-speed display during ETCS operation and/or to manually conceal the tachometer-speed display device by means of a cover.

BRIEF SUMMARY OF THE INVENTION

The object underlying the invention is to further develop a rail vehicle with a tachometer-speed display device and with an ETCS speed display device such that it is easy to avoid the speed being read incorrectly by the vehicle driver.

In order to achieve this object in the case of a rail vehicle of the type specified in the introduction, the glass cover of the tachometer-speed display device is in accordance with the invention an electro chrome glass pane with an electrical connection device It is however known for instance from the internet publication http://de.wikipedia.org/wiki/Intelligentes_Glas that electro chrome glass changes its light permeability depending on the direct voltage applied, for instance it can become opaque if an electro chrome glass pane is applied with a voltage across its electrical connection device, but such an electro chrome glass has however previously only been used in automobile construction as a roof window or to dim out reflections or in the lounge of ICE-3 and ICE-T trains to create a glass partition with the driver's cab.

One significant advantage of the inventive rail vehicle consists in the tachometer-speed display device no longer having to be concealed from the vehicle driver by a cover for safety reasons, if he drives his rail vehicle in ETCS operation. The vehicle driver in this case only needs to actuate one switch in order to apply an electrical voltage to the electro chrome glass pane, so that this becomes opaque and thus prevents the tachometer-speed display device from being read.

It is advantageous if the electrical connection device of the electro chrome glass pane is automatically applied with a direct voltage if the respective rail vehicle starts the ETCS operation. This start-up can be detected in a variety of ways.

It is considered to be particularly advantageous if the electrical connection device is connected to an electrical output of an ETCS vehicle device. The significant advantage of this embodiment of the inventive rail vehicle consists in the existing ETCS vehicle device only having to be provided with an additional electrical output in order to control the electro chrome glass pane. In such cases it is also deemed to be very advantageous if the ETCS vehicle device is embodied such that it automatically generates an electrical voltage at its electrical output upon start-up, which changes the electro chrome glass pane into an opaque state.

The invention further relates to a method for operating a rail vehicle with a tachometer-speed display device and with an ETCS speed display device and has the object of configuring such a method such that incorrect reading of the tachometer-speed display device is avoided.

In order to achieve this object, an electro chrome glass pane with an electrical connection device is used in accordance with the invention as a glass cover of the tachometer-speed display device.

The same advantages result correspondingly as have been cited already above in conjunction with the treatment of the inventive rail vehicle.

It is advantageous if in the inventive method the electrical connection device of the electro chrome glass pane is connected via a switching facility to a direct voltage source, because it is very easy to configure the electro chrome glass pane to be applied with electrical voltage.

It is nevertheless particularly advantageous in the inventive method if an electrical voltage is automatically provided at its electrical output by an ETCS vehicle device during its start-up, said electrical voltage changing the electro chrome glass pane into an opaque state.

BRIEF DESCRIPTION OF THE SEVERAL VIEWS OF THE DRAWING

To further explain the invention,

FIG. 1 shows schematically the ETCS vehicle device of a rail vehicle (not shown in further detail) which is connected on the one hand to an ETCS driver machine interface and on the other hand to a tachometer-speed display device, wherein conventional operation of the rail vehicle is assumed, and FIG. 2 shows the same configuration as in FIG. 1, but in ETCS operation.

DESCRIPTION OF THE INVENTION

FIGS. 1 and 2 show a schematic representation of an ETCS vehicle device 1, which is provided with an electrical output 2 and is connected to this output 2 with an only indicated electrical connection device 3 of an electro chrome glass pane 4 of a tachometer-speed display device 5. On the other hand, the ETCS vehicle device 1 is also connected by way of a bus connection 6 to an ETCS driver machine interface 7 having an ETCS speed display device 8.

In the state shown in FIG. 1, the ETCS vehicle device 1 is not active because the rail vehicle reverts to conventional railway operation. A direct voltage is then not present at the electrical output 2 of the ETCS vehicle device 1 so that the electrical connection device 3 of the electro chrome glass pane 4 is also not applied with a direct voltage. The electro chrome glass pane 4 is thus transparent and the tachometer-speed display device 5 can be read by the vehicle driver. The ETCS speed display device 8 remains dark without any kind of display.

Contrary to the state of the rail vehicle according to FIG. 1, by retaining the reference characters in FIG. 1 the rail vehicle is shown in a state in FIG. 2, by moving in ETCS operation. In this case a direct voltage is generated at the electrical output 2 of the ETCS vehicle device 1, said direct voltage applying the electrical connection device of the electro chrome glass pane 4 and allowing the same to become opaque. The tachometer-speed display device 5 can then no longer be read. By contrast the ETCS speed display device 8 is activated and indicates, only shown schematically, the speed of the rail vehicle.

The invention claimed is:

1. A method for operating a rail vehicle with a tachometer-speed display device and with a second speed display device, which comprises the step of:
    providing an electro chrome glass pane with an electrical connection device as a glass cover of the tachometer-speed display device;
    wherein an electrical voltage is provided by a vehicle device during start-up at an electrical output of the vehicle device, the electrical voltage changing the electro chrome glass pane into an opaque state.

2. The method according to claim 1, which further comprises connecting the electrical connection device to a direct voltage source by way of a switching facility.

3. A rail vehicle, comprising:
    a tachometer-speed display device having a glass cover, said glass cover including:
    an electro chrome glass pane; and
    an electrical connection device associated with said electro chrome glass pane; and
    said glass cover configured to become opaque when a voltage is applied across said electrical connection device; and
    a second speed display device; and
    wherein a voltage is applied across said electrical connection device and said glass cover is opaque when said second speed display device is activated and indicates a speed of the rail vehicle.

4. The rail vehicle of claim 3, wherein the voltage is applied in response to manual actuation of a switch.

5. The rail vehicle of claim 3, wherein a voltage is automatically applied across said electrical connection device if said second speed display device starts operation.

6. The rail vehicle according to claim 3, further comprising a vehicle device having an electrical output, wherein said electrical connection device is connected to said electrical output of said vehicle device and configured such that during operation said vehicle device automatically generates an electrical voltage at said electrical output which changes said electro chrome glass pane into an opaque state.

* * * * *